(12) United States Patent  
Morin et al.

(10) Patent No.: US 6,918,626 B2  
(45) Date of Patent: Jul. 19, 2005

(54) COVER FOR AN OBJECT SUBJECTED TO AN AIRSTREAM

(75) Inventors: André Morin, St-Nicéphore (CA); Marc-André Morin, St-Léonard-D'Acton (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 10/839,393

(22) Filed: May 6, 2004

(65) Prior Publication Data

US 2004/0222661 A1 Nov. 11, 2004

Related U.S. Application Data

(60) Provisional application No. 60/468,075, filed on May 6, 2003, now abandoned.

(51) Int. Cl.⁷ .................................................. B60J 11/00
(52) U.S. Cl. ............................ 296/136.01; 296/136.07; 296/136.1; 150/166
(58) Field of Search ........................ 296/136.01, 136.07, 296/136.1, 136.13; 150/166, 167; 224/328

(56) References Cited

U.S. PATENT DOCUMENTS

| | | | | |
|---|---|---|---|---|
| 5,673,961 A | * | 10/1997 | Mazzarelli | 296/136.07 |
| 5,921,389 A | * | 7/1999 | Zoffer | 206/335 |
| 5,997,071 A | * | 12/1999 | Mazzarelli | 296/136.07 |
| 2002/0069947 A1 | * | 6/2002 | Frechette et al. | 150/166 |

\* cited by examiner

*Primary Examiner*—Jason Morrow  
(74) *Attorney, Agent, or Firm*—BRP Legal Services (57) ABSTRACT

A cover assembly for covering an object subjected to an airstream due to transportation of the object in open air. The cover comprises a flexible cover adapted to fit over the object so as to conceal a portion of the object. An aperture is provided in the cover. A deflector is provided on an exterior surface of the cover and forward of the aperture with respect to a direction of transportation. The deflector is positioned such that a low pressure zone is created proximate to the aperture during transportation of the object in the direction by an airstream being deflected by the deflector, whereby air located between an interior of the cover and the object being transported exhausts through the aperture to an exterior of the cover to cause the cover to at least partially conform to the object.

19 Claims, 6 Drawing Sheets

COVER FOR AN OBJECT SUBJECTED TO AN AIRSTREAM

This application relates to and claims priority from U.S. Provisional Patent Application Ser. No. 60/468,075, filed May 6, 2003, now abandoned, which is hereby incorporated by reference in its entirety.

BACKGROUND OF THE INVENTION

1. Field of the Invention

The present invention generally relates to a flexible cover for protecting an object subjected to an airstream in open-air transport and, more particularly, to a cover for personal watercraft, watercraft, snowmobiles and the like, that conforms closely to the object it protects by differential pressure.

2. Background Art

Flexible covers are widely used in open-air transport to protect objects exposed to an airstream when being towed by a vehicle. For instance, personal watercraft, watercraft and snowmobiles are partially covered during transport to be protected from the elements of weather and from windblown debris inherent to open-air transport.

At highway speeds, looser portions of the protective cover have been known to whip and buffet. In addition to causing some noise, the whipping and buffeting may result in the cover being blown off by the airflow, or the cover being ripped open, thereby temporarily exposing the object being transported.

U.S. Pat. No. 5,997,071, issued on Dec. 7, 1999 to Mazzarelli, discloses a protective cover secured to the object it protects by differential pressure, to overcome the above-cited problems. More precisely, the cover protects a substantial portion of an object, and exhaust apertures are defined in the cover. The exhaust apertures are each covered by a tear-shaped vent member having an open end. The open end of each vent member faces away from a direction of tow. The airstream that results from the tow circumvents the vent members, and the latter are shaped and positioned such that a pressure drop is created at the open end of the vent members. Therefore, as the vent members are each positioned over one exhaust aperture, air concealed between the cover and the object being transported moves out from under the cover through the exhaust apertures. This outflow of air will cause the flexible cover to mold or conform closely to the object that it protects.

U.S. Patent Application Publication No. US 2002/0069947, published on Jun. 13, 2002, from Frechette et al., also describes a flexible protective cover secured to the object it protects by differential pressure. This publication discloses an alternative approach to creating the differential pressure between an interior of the cover and an exterior thereof. In this publication, exhaust apertures are provided in surfaces of the flexible protective cover that face away from the direction of transport. More specifically, two surfaces are identified as being disposed vertically in reference to the direction of travel, and as being disposed on the leeward side of the object. These surfaces are exposed to lower pressures and are hence provided with apertures through which air exhausts from the interior of the cover.

A drawback of the prior art pressure differential systems is that they involve costly solutions. For instance, vent members must be formed of a material having sufficient structural integrity to withstand an airstream. Such vent members must therefore be manufactured according to more complex processes than that typically involved in fabricating covers, such as molding.

Also, some types of pressure differential systems are not efficient on all types of covers. For instance, the pressure differential system of U.S. Patent Application Publication No. US 2002/0069947 requires a given geometry of the objects being covered, for natural low pressure zones providing sufficient suction to be formed. The geometry of some objects does not allow for suction of sufficient magnitude to be created.

SUMMARY OF INVENTION

It is therefore an aim of an aspect of the present invention to provide a novel method of creating a pressure differential between an interior and exterior of a cover covering an object subjected to an airstream in open-air transport.

It is a still further aim of an aspect of the present invention to provide a novel kit for creating a pressure differential between an interior and exterior of a cover covering an object subjected to an airstream in open-air transport.

It is a still further aim of an aspect of the present invention to provide a novel cover that conforms to an object subjected to an airstream in open-air transport by differential pressure.

Therefore, in accordance with the present invention, there is provided a method for creating a pressure differential between an interior and an exterior of a flexible cover covering at least partly an object being transported in open air to cause the cover to at least partially conform to the object, comprising the steps of: providing an aperture in the cover; providing a deflector on an exterior surface of the cover, forward of the aperture with respect to a direction of transportation of the object; and transporting the object in the direction whereby a low pressure zone is created proximate to the aperture by an airstream deflected by the deflector, whereby air located between the interior of the cover and the object being transported exhausts through the aperture to the exterior of the cover.

Further in accordance with the present invention, there is provided a kit for creating a pressure differential between an interior and an exterior of a flexible cover concealing at least a portion of an object being transported in open air to cause the cover to substantially conform to the object by air, located between the interior of the cover and the object, exhausting through an aperture in the flexible cover, comprising: a flexible material tube adapted to be secured to the flexible cover forward of the aperture with respect to a direction of towing; and a reinforcement element adapted to be received in the flexible material tube to brace the cover around the aperture to maintain a shape integrity of the aperture; whereby a low pressure zone is created opposite the aperture during towing of the object in the direction by an airstream being deflected by the flexible material tube reinforced with the reinforcement element, whereby air located between the interior of the cover and the object exhausts toward the low pressure zone through the aperture to the exterior of the cover to create a pressure differential between the interior and the exterior of the flexible cover.

Still further in accordance with the present invention, there is provided a cover assembly for covering an object subjected to an airstream due to transportation of the object in open air, the cover comprising: a flexible cover adapted to fit over the object so as to conceal at least a portion of the object; an aperture in the cover; and a deflector on an exterior surface of the cover and forward of the aperture with respect to a direction of transportation, the deflector being positioned such that a low pressure zone is created proximate to the aperture during transportation of the object in the direction by an airstream being deflected by the deflector, whereby air located between an interior of the cover and the object being transported exhausts through the aperture to an exterior of the cover to cause the cover to at least partially conform to the object.

BRIEF DESCRIPTION OF THE DRAWINGS

Having thus generally described the nature of the invention, reference will now be made to the accompanying drawings, showing by way of illustration a preferred embodiment thereof and in which.

DESCRIPTION OF THE PREFERRED EMBODIMENTS

Figure 1:
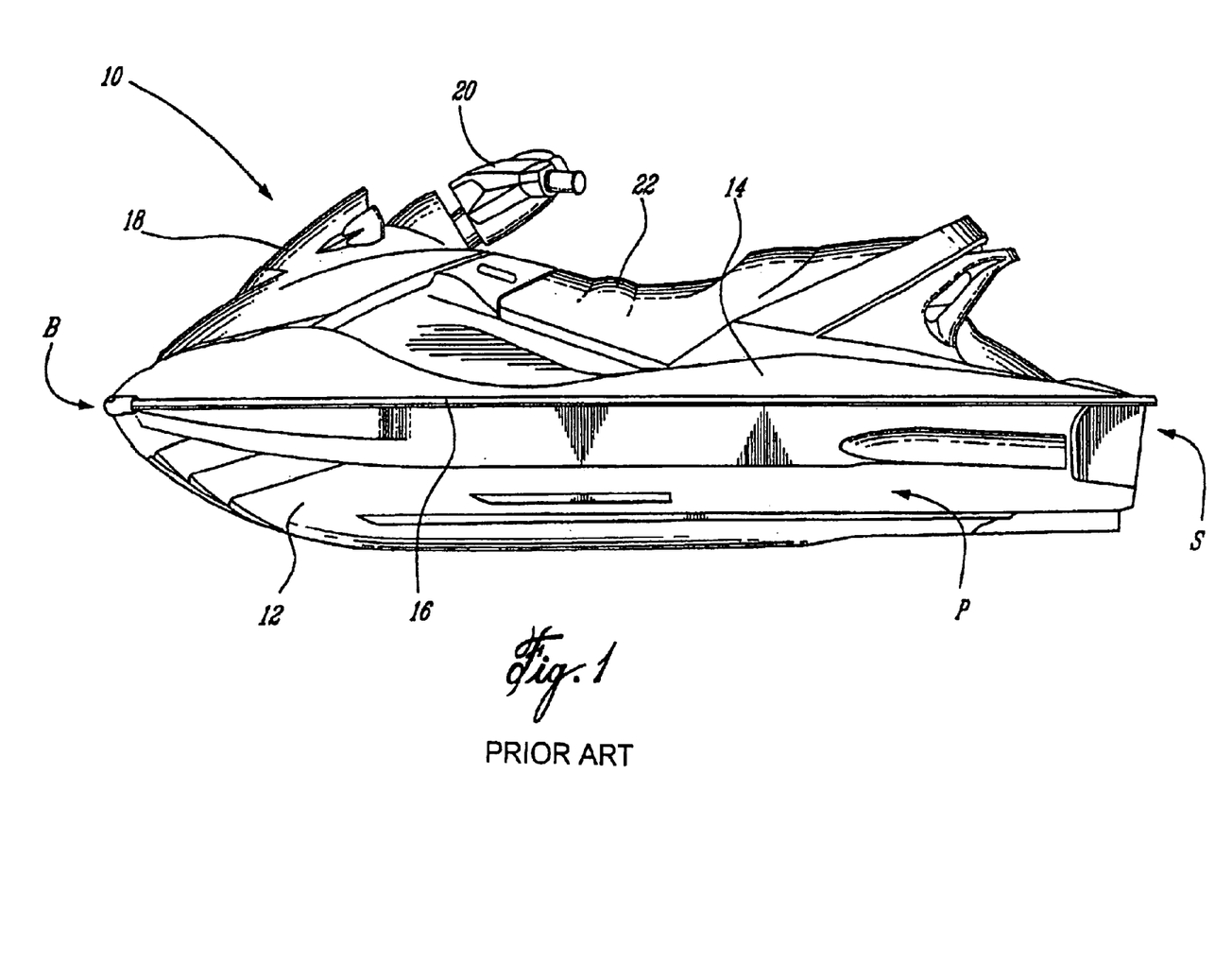
FIG. 1 is a port-side elevational view of a personal watercraft capable of being covered by a cover of the present invention.

Referring to the drawings, and more particularly to FIG. 1, a personal watercraft, upon which a cover in accordance with the present invention will be fitted, is generally shown at 10. The personal watercraft 10 includes a bow B, a stern S, a port P and a starboard (hidden in FIG. 1, but illustrated at "D" in FIG. 2). The personal watercraft 10 has two main parts, namely a hull 12 and a deck 14. The hull 12 buoyantly supports the personal watercraft 10 in a body of water. The hull 12 and the deck 14 meet at bond line 16. From bow B to stern S, the personal watercraft 10 has a hood 18, a helm assembly 20 and a seating area 22. The personal watercraft 10 is of conventional construction, the details of which are unimportant to the current invention.

Figure 2:
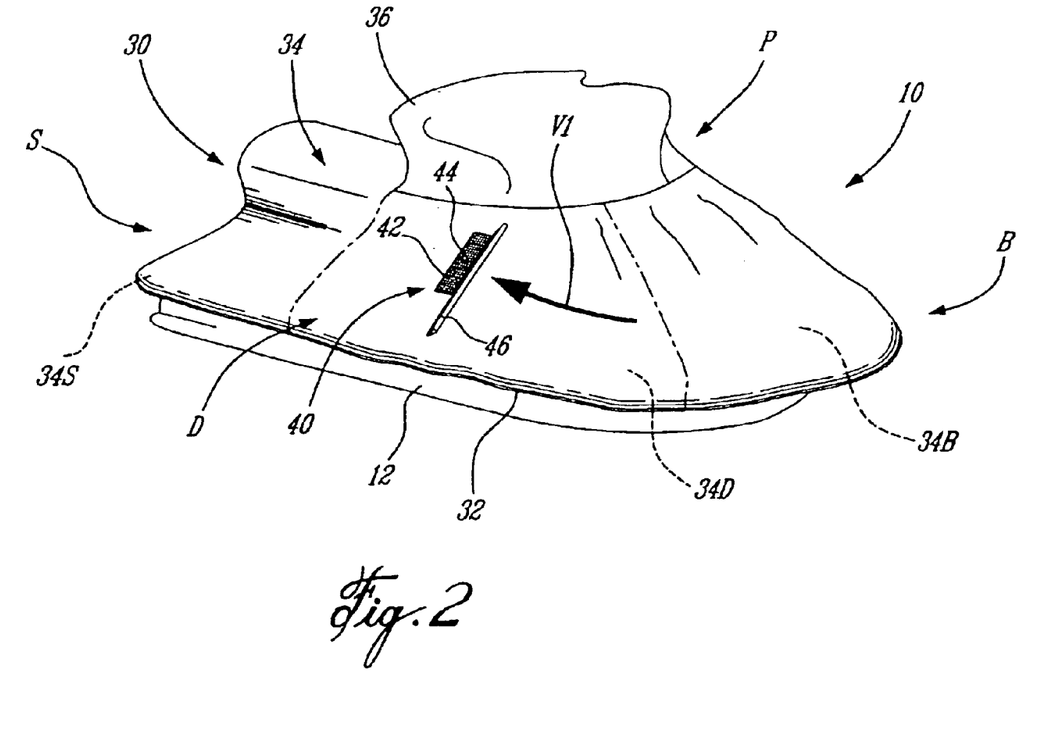
FIG. 2 is a starboard-side perspective view of the personal watercraft of FIG. 1 being protected by a cover in accordance with the present invention.

Referring to FIG. 2, the personal watercraft 10 is shown supporting a flexible cover 30 in accordance with the present invention. The cover 30 is of the type that is slipped onto the personal watercraft 10, such that the personal watercraft 10 is fully covered at and above the bond line 16. Moreover, a portion of the hull 12 is also covered by the cover 30. The bottom open end 32 of the cover 30 includes a peripheral elastic member that will contract onto the convex body of the hull 12, to provide some level of securement of the cover 30 on the personal watercraft 10 so as to be secured to the hull 12. Various other fastening means (e.g., hooks, straps, zippered vent, etc.) can be used additionally or separately in order to secure the cover 30 to the personal watercraft 10.

The cover 30 is generally separated into two major portions. A skirt 34 covers the deck 14 and the bond line 16, as well as the hood 18 and the seating area 22, whereas a cap 36 conceals the helm assembly 20. The skirt 34 is generally separated into a bow portion 34B, a stern portion 34S, and port and starboard portions 34P (FIG. 3) and 34D, respectively. Referring to FIGS. 1 and 2 simultaneously, the bow portion 34B covers the hood 18, the port and starboard portions 34P (FIG. 3) and 34D, respectively, generally cover the flanks of the deck 14, and the stern portion 34S covers an aft portion of the watercraft 10, including a seating area 22. It is pointed out that the cover 30 must be suited to generally cover a personal watercraft of typical construction, whereby the details of the cover are unimportant.

The flexible protective cover 30 typically consists of an air- and water-impermeable material, such as a nylon or a polymeric material (e.g., polyester, polypropylene woven fabric with a polyurethane resin coating), for instance, on a cotton scrim. Once the cover 30 is slipped onto the personal watercraft 10, air is maintained between an interior of the cover 30 and the personal watercraft 10.

Figure 3:
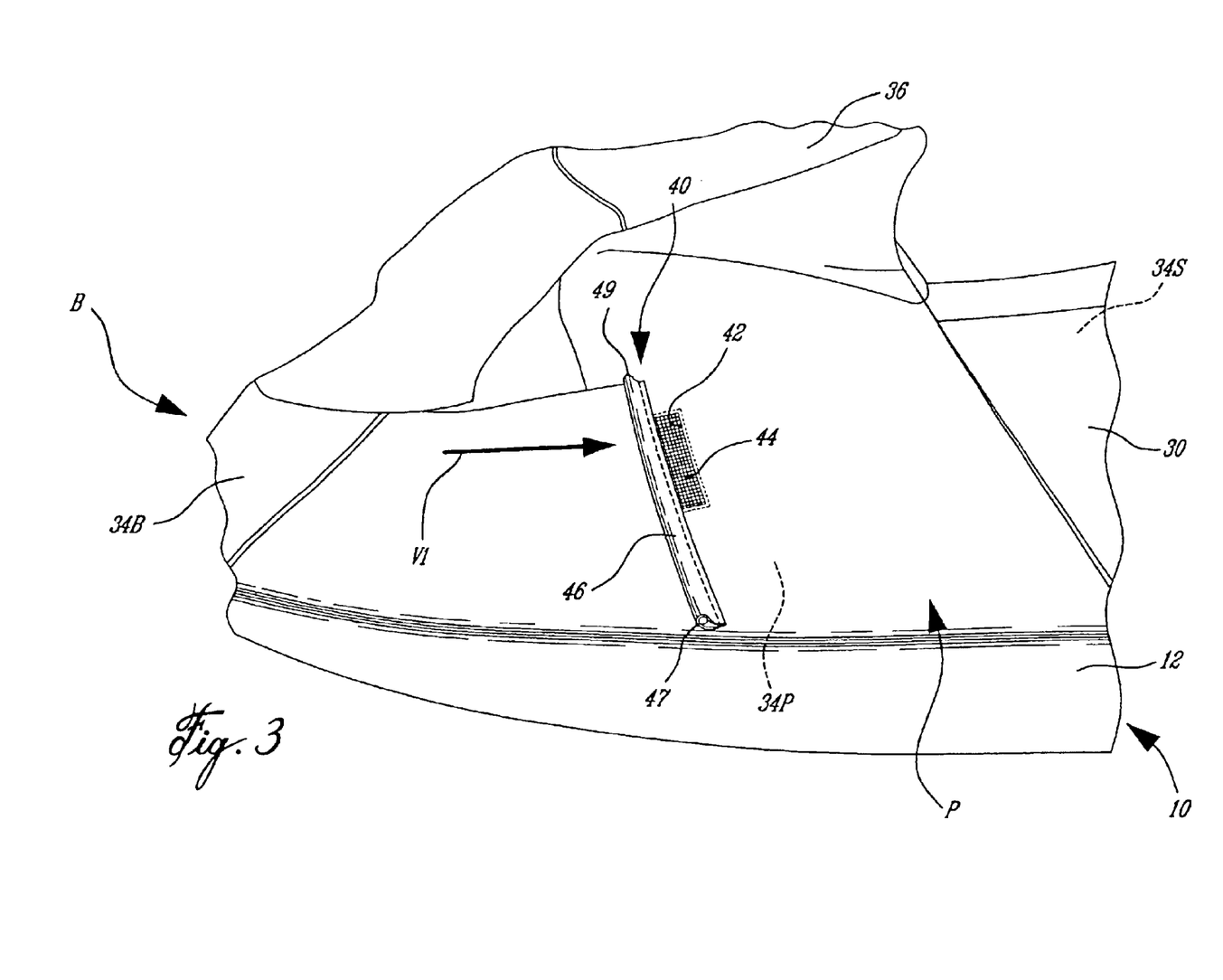
FIG. 3 is an enlarged port-side elevational view of the personal watercraft protected by the cover of the present invention.
Figure 5:
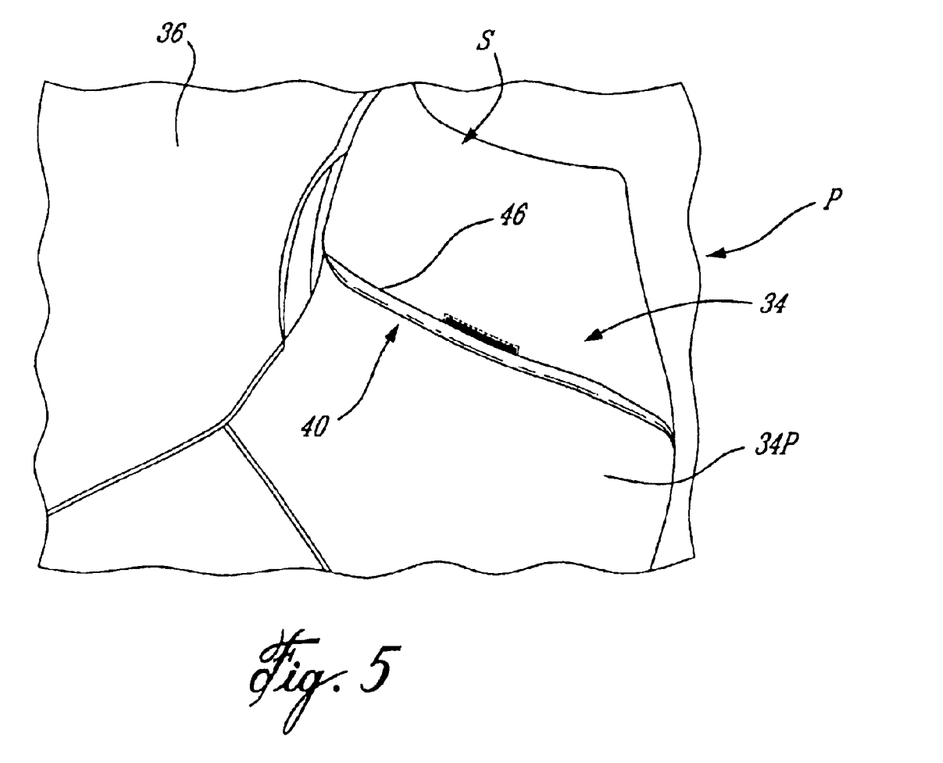
FIG. 5 is an enlarged port-side perspective view of the differential pressure securing system.

In FIG. 2, a differential pressure securing system in accordance with the present invention is generally shown at 40, as provided on the starboard portion 34D of the skirt 34. As shown in FIG. 3, another differential pressure securing system 40 is provided on the port portion 34P of the cover 30, such that both the starboard side D and the port side P have a securing system 40. The differential pressure securing system 40 is shown in greater detail in FIG. 3, as provided on the port portion 34P of the skirt 34. The differential pressure securing system 40 has an exhaust aperture 42. In FIG. 3, the exhaust aperture 42 has a rectangular shape and is provided with a screen 44. A longitudinal dimension of the exhaust aperture 42 is generally perpendicular to the airstream direction over the port portion 34P of the skirt 34, as illustrated by vector V1. A deflector 46, longitudinally parallel to the exhaust aperture 42, is positioned fore of the exhaust aperture 42, and is adjacent to a forward edge of the exhaust aperture 42. The deflector 46 has an elongated quadrilateral shape. Referring to FIG. 5, it is seen that the deflector 46 disrupts the generally smooth surface of the port portion 34P of the skirt 34. Although they are illustrated having quadrilateral shapes, it is appreciated that the exhaust aperture 42 and the deflector 46 can have any other suitable shape to be operative according to the operation of the differential pressure securing system 40, as set forth hereinbelow.

Figure 4:
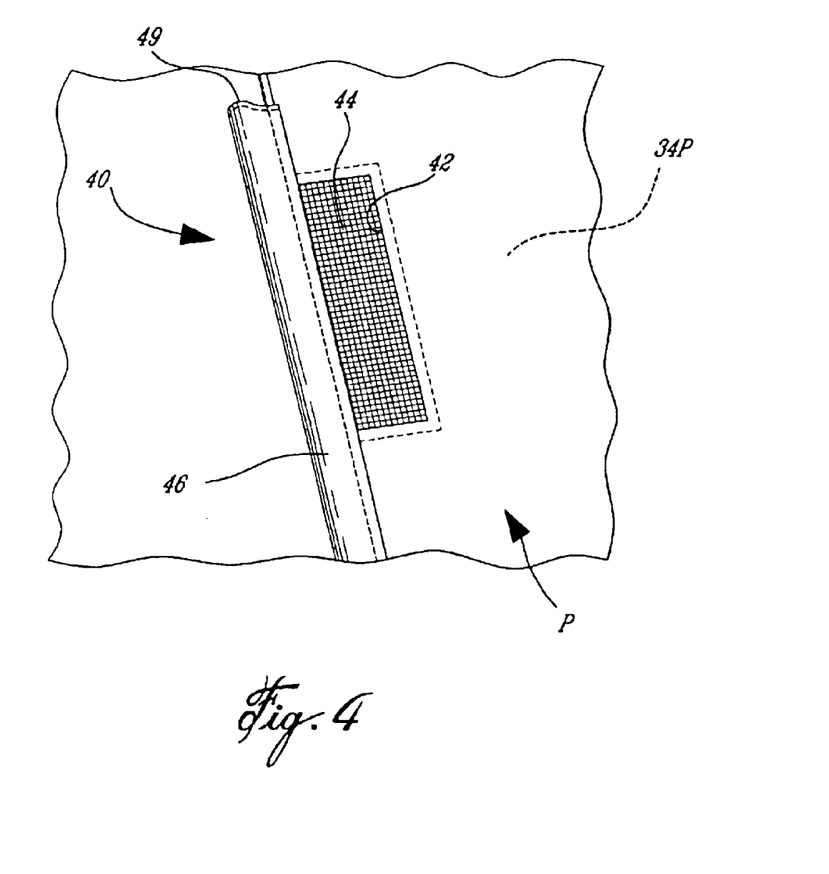
FIG. 4 is an enlarged port-side elevational view of a differential pressure securing system of the present invention.
Figure 6:
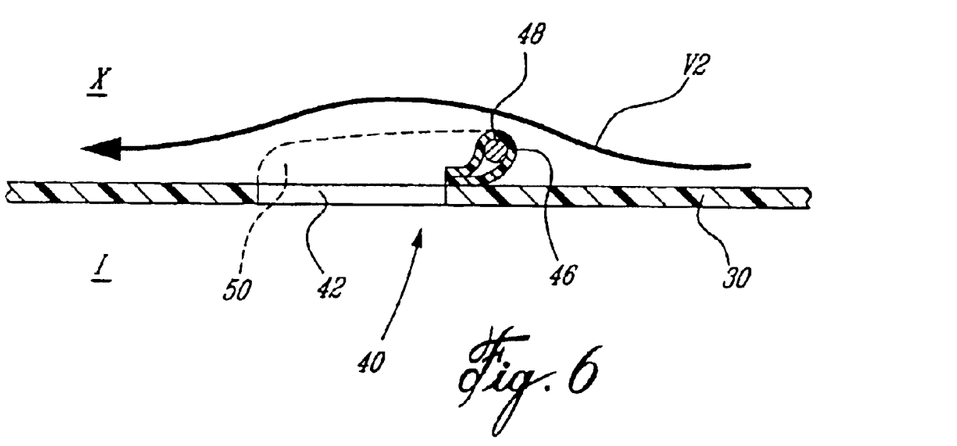
FIG. 6 is a cross-sectional schematic view of the differential pressure securing system of the present invention, with a screen thereof removed.

In the preferred embodiment of the present invention as illustrated in FIG. 6, the deflector 46 consists of a flexible material (e.g., the same material as that of the cover 30), defining a tubular body such that a rigid or semirigid rod 48 is insertable thereinto. The rod 48 consists of a plastic, or of any other suitable material, such as wood, metal, or the like. The deflector 46 is secured (e.g., sewn, glued, fused, or the like) to the cover 30 at an edge thereof adjacent to the forward edge of the exhaust aperture 42. Referring to FIG. 4, a top end 49 and a bottom end (shown at 47 in FIG. 3) of the deflector 46 are secured to the cover 30 in a width dimension of the deflector 46.

Now that the structure of the differential pressure securing system 40 have been illustrated, an operation thereof is described. Referring to FIG. 6, a cross-sectional view of the differential pressure securing system 40 is generally shown, with the screen having been removed from the exhaust aperture 42 for clarity purposes. The interior of the cover 30 is generally shown as "I", whereas an exterior is generally shown as "X". When the personal watercraft 10 is towed, a trajectory of an airstream over the differential pressure securing system 40 is generally shown as "V2". The airstream follows the surface of the cover 30, and is deflected by the deflector 46. The deflector 46, being secured to the cover 30 by an aft edge thereof, has a forward edge thereof lift from the cover 30. The top end 49 (FIGS. 3 and 4) and bottom end 47 (FIG. 3) of the deflector 46 limit the rise of the forward edge of the deflector 46. The trajectory V2 of the airstream around the deflector 46 creates a low pressure zone, approximately shown as 50. The low pressure zone 50 represents a zone where the pressure is below the ambient pressure at the exterior X of the cover 30. Therefore, air lodged in the cover 30 will move toward the low pressure zone 50, thereby escaping the interior I of the cover 30. This will cause a pressure differential between the interior I and the exterior X of the cover 30, whereby the cover 30. will conform closely or adhere to the outer surface of the personal watercraft 10. The "flap" configuration of the deflector 46 (i.e., with the forward edge rising from the cover 30) enhances the deflection of the airstream, thereby increasing the differential pressure at the low pressure zone 50, as well as the size of the low pressure zone 50.

In order to optimize the adherence/conformance of the cover 30 to the body of the personal watercraft 10, it is preferred that the exhaust aperture 42 be positioned opposite an air space between the cover 30 and the personal watercraft 10. Accordingly, the air space defines a plenum that will be taken by air lodged between the cover 30 and the personal watercraft 10 and that will escape through the exhaust aperture 42. Moreover, the cover 30 will adhere better to the personal watercraft 10 the better the sealing is between the interior I and the exterior X of the cover 30, notwithstanding the exhaust aperture 42.

The absolute pressure in the low pressure zone 50 will be inversely proportional to the speed at which the personal watercraft 10 is being towed. Therefore, the higher the towing speed, the more effective the differential pressure securing system 40 will be.

Although the differential pressure securing systems 40 are shown on the port and starboard portions 34P and 34D, respectively, of the skirt 34, it is contemplated to position the differential pressure securing system 40 on other appropriate portions of the cover 30. For instance, lateral portions of the stern portion 34S can host the differential pressure securing system 40. Moreover, as described and illustrated in the preferred embodiment, having a pair of differential pressure securing systems 40 on the port P and starboard D of the personal watercraft 10 enhances the efficiency of the securement.

Referring to FIGS. 2 to 4, the screen 44 prevents road debris (e.g., rocks) from entering the cover 30 through the exhaust apertures 42. The rigid or semirigid rod 48 that is received in the tubular body of the deflector 46 ensures that the corresponding exhaust aperture 42 is not deformed. This reduces the risk of a deformation in one of the exhaust apertures 42, due to the flexible nature of the cover 30, allowing the airstream to enter the cover 30 through the exhaust aperture 42, thereby impeding the pressure differential effect by which the cover 30 adheres onto the personal watercraft 10. Moreover, the rod 48 adds structural integrity to the deflector 46.

Figure 7:
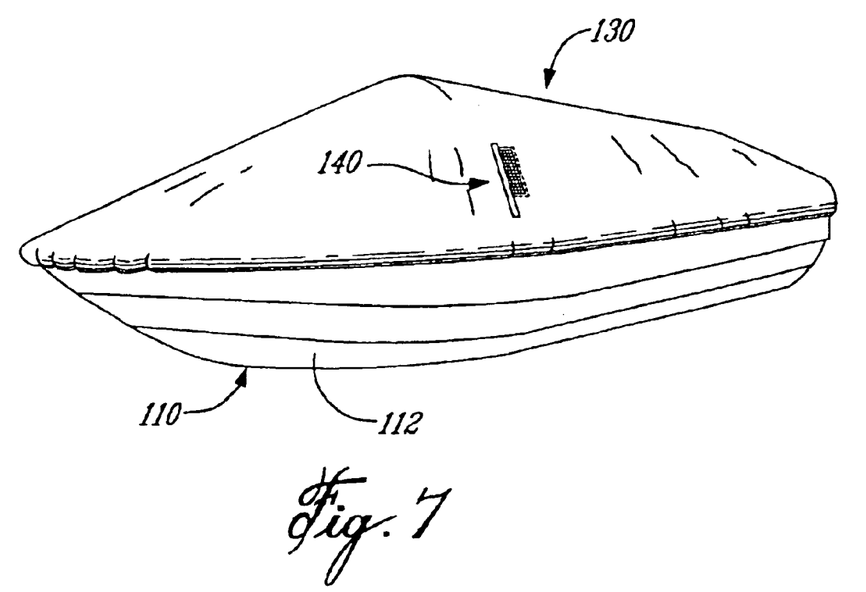
FIG. 7 is a port-side perspective view of a watercraft being protected by a cover in accordance with the present invention.

Although the differential pressure securing system 40 has been operatively illustrated on the cover of a personal watercraft in FIGS. 1 to 5, the differential pressure securing system 40 may also be used with protective covers of other objects to protect them in open-air transport, such as motorcycles, ATVs, snowmobiles, boats, bicycles. As an illustrative embodiment, a watercraft 110 is shown in FIG. 7, protected by a cover 130. The cover 130 has been slipped onto the watercraft 110 such that only a portion of a hull 112 is exposed. A differential pressure securing system 140 is provided in the cover 130, and its position corresponds to the cavity defined by the passenger receiving area of the watercraft 110. This cavity defines the above-mentioned plenum.

We claim:

1. A method for creating a pressure differential between an interior and an exterior of a flexible cover covering at least partly an object being transported in open air to cause the cover to at least partially conform to the object, comprising the steps of:

providing an aperture in the cover;

providing a deflector on an exterior surface of the cover, forward of the aperture with respect to a direction of transportation of the object, the deflector extending at most partly over the aperture; and transporting the object in the direction whereby a low pressure zone is created proximate to the aperture by an airstream deflected by the deflector, whereby air located between the interior of the cover and the object being transported exhausts through the aperture to the exterior of the cover.

2. The method according to claim 1, wherein the deflector is adjacent to the aperture.

3. The method according to claim 1, wherein the aperture is provided opposite an air space defined between the interior of the cover and the object being transported.

4. A kit for creating a pressure differential between an interior and an exterior of a flexible cover concealing at least a portion of an object being transported in open air to cause the cover to substantially conform to the object by air, located between the interior of the cover and the object, exhausting through an aperture in the flexible cover, comprising:

a flexible material tube adapted to be secured to the flexible cover forward of the aperture with respect to a direction of transportation; and a reinforcement element adapted to be received in the flexible material tube to brace the cover around the aperture to maintain a shape integrity of the aperture;

whereby a low pressure zone is created opposite the aperture during transportation of the object in the direction by an airstream being deflected by the flexible material tube reinforced with the reinforcement element, whereby air located between the interior of the cover and the object exhausts toward the low pressure zone through the aperture to the exterior of the cover to create a pressure differential between the interior and the exterior of the flexible cover.

5. The kit according to claim 4, further comprising a screen adapted to be associated with the aperture to prevent debris from entering the cover.

6. The kit according to claim 4, wherein the flexible material tube defines a substantially quadrilateral shape when secured to the cover.

7. The kit according to claim 6, wherein an aft edge of the flexible material tube and end edges of the flexible material tube adjacent to the aft edge are secured to the cover such that a forward edge of the flexible material tube is adapted to rise when the cover is subjected to an airstream to increase the size of the low pressure zone.

8. The kit according to claim 4, wherein the aperture is positioned opposite an air space defined between the cover and the object being transported.

9. A cover assembly for covering an object subjected to an airstream due to transportation of the object in open air, the cover assembly comprising:

a flexible cover adapted to fit over the object so as to conceal at least a portion of the object;

an aperture in the cover; and a deflector on an exterior surface of the cover and forward of the aperture with respect to a direction of transportation, the deflector extending at most partly over the aperture and being positioned such that a low pressure zone is created proximate to the aperture during transportation of the object in the direction by an airstream being deflected by the deflector, whereby air located between an interior of the cover and the object being transported exhausts through the aperture to an exterior of the cover to cause the cover to at least partially conform to the object.

10. The cover assembly according to claim 9, further comprising a screen associated with the aperture to prevent debris from entering the cover.

11. The cover assembly according to claim 9, wherein the deflector comprises flexible material.

12. The cover assembly according to claim 11, wherein the flexible material is tubular so as to receive a reinforcement element therein, the reinforcement element being received in the material so as to be parallel to a longitudinal dimension of the aperture so as to brace the cover around the aperture to maintain a shape integrity of the aperture.

13. The cover assembly according to claim 11, wherein the deflector has a substantially quadrilateral shape.

14. The cover assembly according to claim 13, wherein an aft edge of the deflector and edges of the deflector adjacent to the aft edge are secured to the cover such that a forward edge of the deflector is adapted to rise when the cover is subjected to the airstream to increase a size of the low pressure zone.

15. The cover assembly according to claim 9, wherein the aperture is positioned opposite an air space defined between the cover and the object being transported.

16. The cover assembly according to claim 9, in combination with the object, the object being any one of a personal watercraft, a watercraft, a snowmobile, a motorcycle, an ATV and a bicycle.

17. The cover assembly according to claim 9, wherein the aperture is positioned on a lateral portion of the cover.

18. The cover assembly according to claim 9, wherein separate sets of the aperture and the deflector are provided on opposed lateral portions of the cover.

19. The cover assembly according to claim 11, wherein the flexible material is the same as a material of the cover.

* * * * *